United States Patent [19]

Galuszka et al.

[11] Patent Number: 5,637,259
[45] Date of Patent: Jun. 10, 1997

[54] PROCESS FOR PRODUCING SYNGAS AND HYDROGEN FROM NATURAL GAS USING A MEMBRANE REACTOR

[75] Inventors: Jan Z. Galuszka, Nepean; Safaa Fouda, Ottawa; Raj N. Pandey; Shamsuddin Ahmed, both of Guelph, all of Canada

[73] Assignee: Natural Resources Canada, Ottawa, Canada

[21] Appl. No.: 567,102

[22] Filed: Dec. 4, 1995

[51] Int. Cl.$^6$ ................................................. C07C 1/02
[52] U.S. Cl. ........................ 252/373; 95/41; 423/650; 423/652; 423/359
[58] Field of Search ................ 252/373; 423/650, 423/652, 359; 95/41

[56] References Cited

U.S. PATENT DOCUMENTS

| | | | |
|---|---|---|---|
| 4,414,191 | 11/1983 | Fuderer | 423/359 |
| 4,690,777 | 9/1987 | Valenyi et al. | 252/373 |
| 4,891,950 | 1/1990 | Seufert et al. | 62/37 |
| 4,964,888 | 10/1990 | Miller | 55/58 |
| 4,981,676 | 1/1991 | Minet et al. | 423/682 |
| 5,073,356 | 12/1991 | Guro et al. | 423/415 |
| 5,152,975 | 10/1992 | Fong et al. | 423/652 |
| 5,229,102 | 7/1993 | Minet et al. | 423/652 |
| 5,310,506 | 5/1994 | Supp et al. | 252/373 |
| 5,354,547 | 10/1994 | Rao et al. | 423/650 |

*Primary Examiner*—C. Warren Ivy
*Assistant Examiner*—Sreeni Padmanabhan

[57] ABSTRACT

Novel procedures are described for the production of syngas fuel intermediates from abundantly available natural gas. The novel procedures include: (a) providing a double tubular hydrogen transfer reactor having an inner tubular wall defining a heated reaction zone containing a catalyst and an outer tubular wall defining an annular zone between the tubular walls, said inner tubular wall including a hydrogen semipermeable membrane portion adapted to permit diffusion of hydrogen therethrough from the reaction zone to the annular zone while being impervious to other gases, (b) passing through said catalytic reaction zone of a feedstock comprising a mixture of methane and oxygen or a mixture of methane and carbon dioxide or a mixture of methane, carbon dioxide and oxygen, (c) continuously removing from the reaction zone at least part of the hydrogen being formed by diffusion thereof through said hydrogen semipermeable membrane into said annular zone, (d) continuously removing diffused hydrogen from said annular zone and (e) continuously removing a product mixture of carbon monoxide and hydrogen from the reaction zone.

11 Claims, 1 Drawing Sheet

PROCESS FOR PRODUCING SYNGAS AND HYDROGEN FROM NATURAL GAS USING A MEMBRANE REACTOR

BACKGROUND OF THE INVENTION

This invention relates to a process for the production of a fuel intermediate consisting of a mixture of hydrogen and carbon monoxide from natural gas.

Natural gas, in which methane is the principal constituent, is an abundant resource with a world reserve estimated at over $100 \times 10^{12}$ m$^3$. Carbon dioxide is a major byproduct in many industries. At present, there is no known technology for utilization of carbon dioxide. However, considerable effort is being expended to develop processes for conversion of methane to value-added products. Major areas of focus include partial oxidation to methanol, oxyhydrochlorination to methyl chloride and oxidative coupling to ethylene.

There is also considerable interest in the conversion of natural gas to a mixture of carbon monoxide and hydrogen, frequently referred to as synthesis gas (syngas). Renewed interest in synthesis gas production has been stimulated by a variety of environmental and technological issues. It is estimated that the global methanol market will need an additional 10 million metric tons per annum of methanol capacity by the year 2000. Methanol can be used either as a transportation fuel in a modified vehicular engine, or can be converted to gasoline (by Mobil's MTG Process) or reacted with isobutylene to produce MTBE which is an important ingredient for reformulated gasoline. In the United States alone, hydrogen production capacity now under construction totals more than 220 million SCFD in conjunction with new distillate hydrotreaters. Also, ammonia production is still the largest single consumer of syngas. The importance of syngas is well recognized in the chemical industries, in the production of synthetic fuels by Fischer-Tropsch process and mixed alcohols. Because a mixture of carbon monoxide and hydrogen can be readily transformed into gasoline range hydrocarbons, it will be referred to hereinafter as "fuel intermediate". Existing technology for the production of synthetic gas involves catalytic steam reforming of feedstocks such as natural gas, light and heavy oils and coal. One such process is described in Miner et al., U.S. Pat. No. 5,229,102, issued Jul. 20, 1993. However, a number of disadvantages arise in the existing technology. Steam reforming is strongly endothermic (energy intensive), requires high temperatures (>850° C.) and high pressures (>20 atm) to achieve acceptable yields, causes severe coking of the catalysts, and produces a product mixture with H$_2$/CO ratio >3 (with natural gas as feedstock) and with H$_2$/CO ratio <0.7 (with coal and refinery oil as feedstock) both of which are unsuitable for most applications without secondary reforming. On the whole, the existing technology is highly capital intensive, accounting for more than 70% of the total investment and operating costs in methanol production based on natural gas conversion process. Syngas is also produced by non-catalytic partial oxidation (POX) of methane, e.g. as described in Fong et al, U.S. Pat. No. 5,152,975, issued Oct. 6, 1992. However, operation at high temperatures (>1300° C.) and high pressures (>150 atm) is essential to obtain high selectivities by this process. The overall comparative economics of syngas production technologies continues to favour steam methane reforming despite the drawbacks mentioned above. The growing interest in C-1 chemistry to accomplish large-scale conversion of natural gas to liquid fuel has created a need to find a cost-effective technology for the production of syngas fuel intermediate.

Therefore, one objective of the present invention is to provide novel routes for the production of syngas fuel intermediate from abundantly available natural gas. These routes involve less capital investments and operating costs than existing steam reforming technology and avoid the necessity for severe operating conditions of high temperature and high pressure of convention technology.

Another objective of this invention is to exploit the potential of a membrane reactor technology to attain much higher conversions of natural gas and selectivities to fuel intermediate than those achievable in a conventional reactor.

Another objective of this invention is to provide a highly economical route for in situ production of pure hydrogen from natural gas by means of partial oxidation and reaction with carbon dioxide in a hydrogen semipermeable chemical reactor. In contrast to existing steam reforming technology, this route does not require expensive down stream separation.

SUMMARY OF THE INVENTION

This invention relates to a process for producing a fuel intermediate comprising a mixture of carbon monoxide and hydrogen from natural gas. The process steps include: (a) providing a double tubular hydrogen transfer reactor having an inner tubular wall defining a heated reaction zone containing a catalyst and an outer tubular wall defining an annular zone between the tubular walls, said inner tubular wall including a hydrogen semipermeable membrane portion adapted to permit diffusion of hydrogen therethrough from the reaction zone to the annular zone while being impervious to other gases, (b) passing through said catalytic reaction zone of a feedstock comprising a mixture of methane and oxygen or a mixture of methane and carbon dioxide, or a mixture of methane, carbon dioxide and oxygen, (c) continuously removing from the reaction zone at least part of the hydrogen being formed by diffusion thereof through said hydrogen semipermeable membrane into said annular zone, (d) continuously removing diffused hydrogen from said annular zone and (e) continuously removing a product mixture of carbon monoxide and hydrogen from the reaction zone.

A first embodiment of the invention (hereinafter referred to as Process 1) relates to a novel and efficient process for the production of a fuel intermediate consisting of a mixture of carbon monoxide and hydrogen from natural gas by partial oxidation, typically at temperatures in the range of about 500° to 750° C. The reaction is conveniently carried out at atmospheric pressure, although elevated pressure may also be used. The reaction is conducted in a hydrogen transfer reactor in which the product hydrogen is selectively and continuously withdrawn from the reaction zone by diffusion through the semipermeable membrane wall of the reactor.

The main chemical reactions which occur during partial oxidation of natural gas to carbon monoxide and hydrogen are:

| | H°$_{298K}$ (kJ/mol) | |
|---|---|---|
| CH$_4$ + 2 O$_2$ → CO$_2$ + 2 H$_2$O | −802 | (1) |
| CH$_4$ + H$_2$O ⇌ CO + 3 H$_2$ | 206 | (2) |
| CH$_4$ + CO$_2$ ⇌ 2 CO + 2 H$_2$ | 247 | (3) |
| CO + H$_2$O → CO$_2$ + H$_2$ | −41 | (4) |

Initially, methane undergoes combustion [reaction (1)] producing carbon dioxide and water. During this step, oxygen may be entirely consumed. The formation of carbon monoxide and hydrogen is the result of secondary reactions of unreacted methane with water and carbon dioxide [reactions (2) and (3)]. The final product composition is further affected by the water gas shift reaction [reaction (4)].

Reactions (2) and (3) are reversible endothermic reactions. The reversible nature of these reactions imposes a limit, determined by the position of thermodynamic equilibria, on the achievable conversion and yields of carbon monoxide and hydrogen at a given temperature in a conventional reactor. Because of high endothermicity of these reactions, this limit is well below commercially acceptable levels, unless reaction temperature is very high (>800° C.). However, if one of the reaction products (for example, hydrogen) is selectively and continuously removed from the reaction zone, the equilibrium limitations of a conventional reactor can be circumvented. The withdrawal of hydrogen displaces the equilibria of reactions (2) and (3) to the product side. Therefore, the overall achievable conversion is expected to be much greater than that dictated by thermodynamic equilibrium. Alternatively, this offers the possibility of obtaining a given level of conversion at a much lower operating temperature than realized in a conventional reactor.

Process I of this invention relates to achieving this objective by conductive methane partial oxidation reaction in a reactor comprising of a hydrogen semipermeable membrane wall. The reactor allows hydrogen to diffuse out through its wall but is impervious to other gases, thereby continuously driving the equilibria of reactions (2) and (3) to the product side.

A variety of known catalysts containing various metals, such as iron, cobalt, nickel, ruthenium, rhodium, palladium, iridium, platinum, cerium etc., may be used for the process of invention. The metal is usually supported and a large variety of supports may be used, such as alumina, silica, magnesia, zirconia, yttria, calcium oxide, zinc oxide, perovskites, lanthanide oxides, etc., e.g. as described in Tsang et al., Catalysis Today, 23, 3, (1995), incorporated herein by reference. These supported catalysts may be used in either fixed bed or fluidized bed form.

The membrane is preferably in the form of a thin film of a metal, such as palladium or its alloys, or thin film of silica, alumina, zirconia or a zeolite. The film thickness typically ranges from 1 μm to about 25 μm. A preferred thin film is palladium with a thickness of about 5 to 15 μm. To assure the mechanical strength, the thin film is preferably supported on an inert, porous tubular substrate at least 1 millimeter thick, e.g. a porous ceramic material such as a porous alumina or porous Vycor™ glass typically having pore sizes larger than about 40 nm, preferably about 4–300 nm. The thin film is deposited on the porous substrate by various techniques, e.g. electroless-plating, electroplating, sputtering, chemical vapour deposition, sol-gel deposition etc. The supported membrane must be capable of selectively passing hydrogen to the exclusion of the other gases, preferably with a good flux. It is also preferable to maintain a hydrogen ΔP across the membrane.

According to one preferred aspect of Process I of this invention, supported palladium catalysts (wherein the support is α-$Al_2O_3$, γ-$Al_2O_3$, $SiO_2$ and $ZrO_2$) are used for the partial oxidation of methane to syngas fuel intermediate in a conventional reactor. The catalysts produce the fuel intermediate at reaction temperatures 500° C. and above, and $CH_4/O_2$ feed ratios from 6 to 1. The conversion of methane and selectivity to a fuel intermediate increase with reaction temperature, the latter reaching more than 95% between temperatures 600°–650° C. Examination of conventional reactor effluent composition in the light of thermodynamic equilibrium constants showed that reactants and products attained equilibrium composition according to reactions (2), (3) and (4) under most of the experimental conditions. This indicated that scope existed to take advantage of membrane reactor technology to enhance the partial oxidation of natural gas to a syngas fuel intermediate.

According to another preferred aspect of Process I of this invention, a hydrogen transfer reactor was prepared. It consisted of a palladium membrane superimposed on the inner wall of an asymmetric porous alumina tube (Membralox™) supplied by ALCOA. The palladium film was deposited by an electroless plating technique. The plating mixture consisted of palladium-amine complex, hydrazine, EDTA and ammonium hydroxide. Hydrazine acted as the reducing agent, while EDTA acted as an effective stabilizer against homogeneous decomposition of the mixture. Plating was done at ≈55° C. and pH=12. The deposition was continued for approximately 30 h, with renewal of the plating solution every half hour. Before plating, the inner surface of the porous alumina tube was activated by subjecting to sensitization and activation treatment using $SnCl_2$ and $PdCl_2$ solutions. The thickness of the deposited film was approximately 10 μm. The hydrogen transfer reactor was assembled by placing the membrane tube inside a stainless steel cylinder as shown in FIG. 1 and the two were sealed gas tight at the two ends. The selective hydrogen permeability characteristics of membrane reactor was verified.

A second main embodiment of this invention (hereinafter referred to as Process II) offers a second process for efficient production of syngas fuel intermediate and hydrogen from natural gas. In this process, methane is reacted with carbon dioxide in a hydrogen transfer reactor (packed with catalyst bed) wherein the product is selectively and continuously removed from the reaction zone through the semipermeable wall of the reactor.

Conversion of methane to syngas occurs according to the following overall reaction:

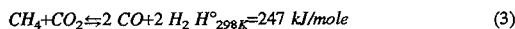
$$CH_4 + CO_2 \rightleftharpoons 2\ CO + 2\ H_2\ H°_{298K} = 247\ kJ/mole \tag{3}$$

The product distribution or $H_2/CO$ ratio in the product stream is further influenced by the water gas shift reaction:

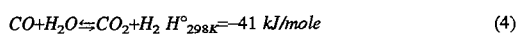
$$CO + H_2O \rightleftharpoons CO_2 + H_2\ H°_{298K} = -41\ kJ/mole \tag{4}$$

Due to the reversible nature of reaction (3), there is a limit, determined by the position of thermodynamic equilibrium, to the conversion achievable of $CH_4$ and yields of CO and $H_2$ at a given temperature.

Process II of this invention relates to circumventing this equilibrium-controlled limit of conversion by taking advantage of a hydrogen transfer reactor. Continuous and selective removal of hydrogen from the reaction zone via diffusion through the permselective reactor wall pushed the equilibrium towards high conversion than achievable in a conventional closed reactor.

According to one aspect of Process II of this invention, supported palladium is used as catalyst for production of a syngas fuel intermediate and hydrogen by reaction of $CH_4$ with $CO_2$ in a conventional closed reactor. Examination of the conventional reactor exist stream data showed that equilibrium was reached in reactions (2), (3) and (4) under most of the experimental conditions. Attainment of equilibrium in the reaction (3) is of particular importance. This implies that scope exists to exploit membrane reactor technology to promote production of syngas and hydrogen by reaction of $CH_4$ with $CO_2$.

Figure 1:
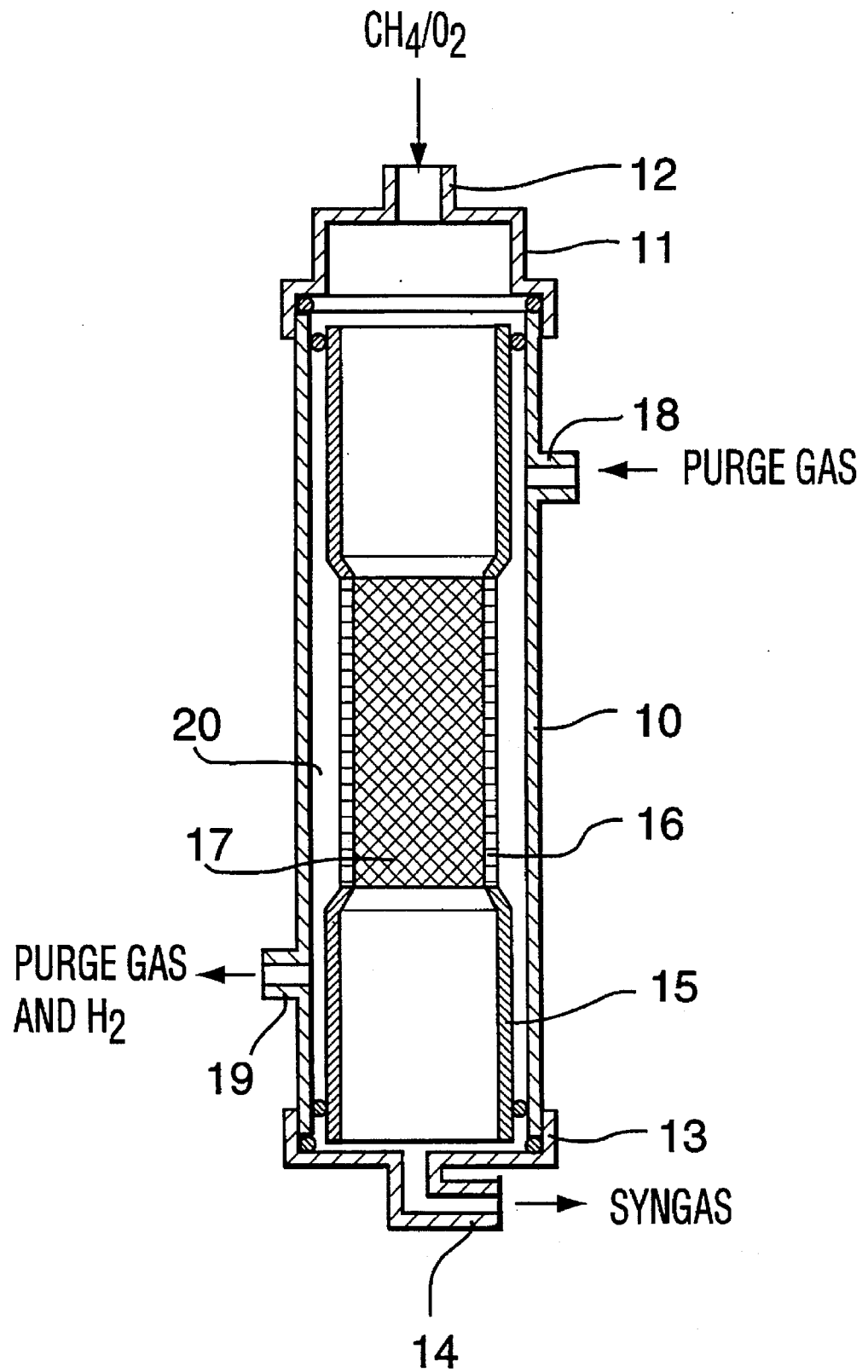
FIG. 1 is a partial sectional elevation of a hydrogen transfer reactor of the invention.

The reactor of this invention includes an outer tubular member 10 having a top cap 11 with an inlet nipple 12 for connection to a $CH_4/O_2$ supply. The bottom end of tubular member 10 is closed by a bottom cap 13 with an outlet nipple 14 for connection to a syngas product discharge line.

Mounted within tubular member 10 is an inner tubular member 15, a portion of the wall of which comprises a membrane 16. Within the membrane portion is a fixed catalyst bed 17.

Between the outer tubular member 10 and the inner tubular member 15 is an annular chamber 20 within which hydrogen passing through membrane 16 is collected. A purge gas is passed through chamber 20 via inlet nipple 18 and outlet nipple 19. The ends of chamber are sealed against any gas flow by means of sealing members 21.

DESCRIPTION OF THE PREFERRED EMBODIMENTS

Certain preferred embodiments of the present invention are illustrated by the following non-limiting examples.

EXAMPLE 1

The partial oxidation of methane to a syngas fuel intermediate was carried out in a fixed bed continuous flow double tubular hydrogen transfer reactor as shown in FIG. 1. The inner tube (membrane tube) of the reactor was charged with 1.0 gram of 5.0 wt % $Pd/\gamma-Al_2O_3$ catalyst, prepared by incipient wetness impregnation of the support with a solution of $PdCl_2$ salt, followed by drying at 120° C. Before the reaction, the catalyst was calcined at 500° C. under $N_2$ flow for 2 hours, followed by reduction at 500° C. under hydrogen flow for 2 hours. The feed stream consisting of mixture of $CH_4$, $O_2$ and $N_2$ was passed through inner membrane tube and sweep gas (Ar) was passed through the outer shell tube. The catalyst bed was maintained at 500° C. The inner and outer streams were analyzed separately for products and reactants by TCD-gas chromatography. $CH_4$, $O_2$, $N_2$, and CO were analyzed with a molecular sieve 5A column employing helium as carrier gas. $CO_2$ was analyzed with a Porapak T™ column employing helium as carrier gas. $H_2$ was analyzed with a molecular sieve 5A column employing argon as carrier gas. Methane conversion and selectivity to the products were determined. Selectivity to CO is defined on the basis of total CO and $CO_2$ in the products. Selectivity to $H_2$ is defined on the basis of total $H_2$ and $H_2O$ in the products. The results are reported in Table A. Included in Table A are the results of a duplicate experiment in a fixed bed conventional flow reactor to compare and evaluate the performance of the membrane reactor.

TABLE A

Enhancement in Catalytic Conversion of Natural Gas to Syngas Fuel Intermediate and Hydrogen by Partial Oxidation in a Hydrogen Transfer Reactor (Catalyst: 5.0 wt % $Pd/\gamma-Al_2O_3$; catalyst mass: 1.0 g; Reaction Temperature: 500° C.; Feed flowrate = 87 mL min$^{-1}$; Sweep gas flowrate = 40 mL min$^{-1}$ in the case of hydrogen transfer reactor); Feed composition (in mole %): $CH_4$ = 37, $O_2$ = 12.5, $N_2$ = balance)

|  | Conventional Reactor | Membrane Reactor |
|---|---|---|
| $CH_4$ conv. (%) | 26.7 | 40.3 |
| $O_2$ conv. (%) | ≈100 | ≈100 |
| CO sel. (mol %) | 20.0 | 63.0 |
| $H_2$ sel. (mol %) | 68.5 | 85.5 |
| CO yield (mol %) | 5.3 | 25.4 |
| $H_2$ yield (mol %) | 18.3 | 35.5 |
| $H_2$/CO mole ratio | 7.0 | 2.8 |

EXAMPLE 2

The partial oxidation of methane to a syngas fuel intermediate was conducted in a fixed bed double tubular hydrogen transfer reactor as shown in FIG. 1 using the same catalyst as that in Example 1. The reaction temperature was 550° C. All other conditions were the same as those in Example 1. A duplicate experiment was conducted in a fixed bed conventional reactor to compare and evaluate the performance of the membrane reactor. The results are reported in Table B.

TABLE B

Enhancement in Catalytic Conversion of Natural Gas to Syngas Fuel Intermediate and Hydrogen by Partial Oxidation in a Hydrogen Transfer Reactor (Reaction Temperature: 550° C.; All other conditions including catalyst employed were the same as those in Table A)

|  | Conventional Reactor | Membrane Reactor |
|---|---|---|
| $CH_4$ conv. (%) | 34.7 | 45.7 |
| $O_2$ conv. (%) | ≈100 | ≈100 |
| CO sel. (mol %) | 50.9 | 76.3 |
| $H_2$ sel. (mol %) | 83.5 | 87.0 |
| CO yield (mol %) | 17.7 | 34.9 |
| $H_2$ yield (mol %) | 29.0 | 40.5 |
| $H_2$/CO mole ratio | 3.3 | 2.3 |

EXAMPLE 3

Partial oxidation of methane to syngas fuel intermediate was conducted in a fixed bed double tubular hydrogen transfer reactor as shown in FIG. 1 using the same catalyst as that in Example 1. The reaction temperature was 350° C. All other operating conditions were the same as those in Example 1. A duplicate experiment was conducted in a fixed bed conventional reactor to compare and evaluate the performance of the membrane reactor. The results are reported in Table C.

TABLE C

Enhancement in Catalytic Conversion of Natural Gas to Syngas Fuel Intermediate and Hydrogen by Partial Oxidation in a Hydrogen Transfer Reactor (Reaction Temperature: 350° C.; All other conditions including catalyst employed were the same as those in Table A)

|  | Conventional Reactor | Membrane Reactor |
| --- | --- | --- |
| $CH_4$ conv. (%) | 18.4 | 22.9 |
| $O_2$ conv. (%) | ≈100 | ≈100 |
| CO sel. (mol %) | t | 10.5 |
| $H_2$ sel. (mol %) | 24.0 | 55.0 |
| CO yield (mol %) | t | 2.3 |
| $H_2$ yield (mol %) | 4.4 | 13.8 |
| $H_2$/CO mole ratio | — | 11.9 |

Tables A to C demonstrate that conversion of $CH_4$, and selectivity and yield of fuel intermediate (CO and $H_2$) are considerably enhanced in the case of the membrane reactor. The effect was most remarkable at 500° C. and 550° C. For example, at 500° C., conversion of $CH_4$ increased from 25% in the conventional reactor to 40% in the membrane reactor. Concomitantly, selectivity to CO increased from 20 to 63%, and to $H_2$ from 68 to 85%. The yield of CO increased from 5 to 25% and that of $H_2$ from 18 to 36%.

EXAMPLE 4

The catalytic reaction of methane with carbon dioxide producing a syngas fuel intermediate was conducted in a fixed bed continuous flow double tubular hydrogen transfer reactor as shown in FIG. 1. The inner tube (membrane tube) of the reactor was charged with 1.0 g 5.0 wt % Pd/γ-$Al_2O_3$ prepared an by incipient wetness impregnation technique. Before the reaction, the catalyst was calcined at 500° C. under $N_2$ flow for 2 hours, followed by reduction at 500° C. under hydrogen flow for 2 hours. The feed stream consisting of a mixture of $CH_4$, $CO_2$ and $N_2$ was passed through the inner membrane tube and sweep gas (Ar) was passed through the outer tube. The catalyst bed was maintained at 500° C. The inner and outer streams were analyzed for products and reactants by TCD-gas chromatography. $CH_4$, $N_2$ and CO were analyzed on a molecular sieve 5A column employing helium as carrier gas. $CO_2$ was analyzed on a Porapak T™ column employing helium as carrier gas. $H_2$ was analyzed with a molecular sieve 5A column employing argon as carrier gas.

Conversion of methane and carbon dioxide, yields of carbon monoxide and hydrogen, and selectivity to $H_2$ were determined. Conversions were calculated in the usual way from the input and output molar flows of the reactant. Yield of CO is defined as the ratio of molar flow of CO in the product to the sum of molar flows of $CH_4$ and $CO_2$ in the feed expressed as percentage. Yield of $H_2$ is defined as the ratio of molar flow of $H_2$ in the product to the two times of molar flow of $CH_4$ in the feed. The selectivity of $H_2$ is defined on the basis of total $H_2$ and $H_2O$ in the products. Because $CO_2$ was also a reactant, selectivity to CO has no significance. Table D includes the results of a duplicate experiment in a closed conventional flow reactor to compare and evaluate the performance of the membrane reactor.

TABLE D

Promotion of the Catalytic Conversion of Natural Gas to Syngas Fuel Intermediate and Hydrogen by Reaction with Carbon Dioxide in a Hydrogen Transfer Reactor (Catalyst: 5.0 wt % Pd/γ-$Al_2O_3$; catalyst mass: 1.0 g; Reaction Temperature: 550° C.; Feed flowrate = 95 mL min$^{-1}$; Sweep gas flowrate = 40 mL min$^{-1}$ in the case of hydrogen transfer reactor); Feed composition (in mole %): $CH_4$ = 31.5, $CO_2$ = 26, $N_2$ = balance)

|  | Conventional Reactor | Membrane Reactor |
| --- | --- | --- |
| $CH_4$ conv. (%) | 17.2 | 37.5 |
| $CO_2$ conv. (%) | 24.6 | 51.0 |
| $H_2$ sel. (mol %) | 87.5 | 87.5 |
| CO yield (mol %) | 21.5 | 42.0 |
| $H_2$ yield (mol %) | 15.8 | 33.0 |
| $H_2$/CO mole ratio | 0.81 | 0.85 |

EXAMPLE 5

The catalytic conversion of methane to a syngas fuel intermediate by reaction with carbon dioxide was carried out in a fixed bed continuous flow double tubular hydrogen transfer reactor using the same catalyst as that in Example 4. The reaction parameters were the same as those in Example 4 except the reaction temperature was 600° C. A duplicate experiment was conducted in the closed conventional reactor to compare and evaluate the hydrogen transfer reactor. The results are reported in Table E.

TABLE E

Promotion of the Catalytic Conversion of Natural Gas to Syngas Fuel Intermediate and Hydrogen by Reaction with Carbon Dioxide in a Hydrogen Transfer Reactor (Reaction Temperature: 600° C.; All other conditions including catalyst employed were the same as those in Table D)

|  | Conventional Reactor | Membrane Reactor |
| --- | --- | --- |
| $CH_4$ conv. (%) | 40.9 | 48.6 |
| $CO_2$ conv. (%) | 56.6 | 63.0 |
| $H_2$ sel. (mol %) | 89.8 | 91.0 |
| CO yield (mol %) | 50.3 | 54.5 |
| $H_2$ yield (mol %) | 38.1 | 46.5 |
| $H_2$/CO mole ratio | 0.84 | 0.94 |

It is evident from above examples that at 550° C. remarkable increase in the conversions of $CH_4$ and $CO_2$ occurred in the membrane reactor. Concurrently, yields of CO and $H_2$ also increased dramatically (from 21% to 42% for CO and from 16% to 33% for $H_2$).

The essential characteristics of the present invention are described in the foregoing disclosure. One skilled in the art can understand the invention and make various modifications thereto without departing from the basic spirit thereof, and without departing from the scope and range of equivalents of the claims which follow.

We claim:

1. A process for producing a fuel intermediate comprising a mixture of carbon monoxide and hydrogen from natural gas that includes:

(a) providing a double tubular hydrogen transfer reactor having an inner tubular wall defining a heated reaction zone containing a catalyst and an outer tubular wall defining an annular zone between the tubular walls, said inner tubular wall including a hydrogen semipermeable membrane portion adapted to permit diffusion of hydrogen therethrough from the reaction zone to the annular zone while being impervious to other gases, said membrane portion comprising an inert, porous tubular substrate at least 1 mm thick and having deposited on a surface thereof a dense membrane film composed of a metal or a material selected from the group consisting of silica, alumina, zirconia or zeolite, said dense film having a thickness in the range of from 1 μm to about 25 μm, (b) passing through said catalytic reaction zone of a feedstock comprising a mixture of methane and oxygen or a mixture of methane and carbon dioxide or a mixture of methane, carbon dioxide and oxygen, (c) continuously removing from the reaction zone at least part of the hydrogen being formed by diffusion thereof through said hydrogen semipermeable membrane into said annular zone, (d) continuously removing diffused hydrogen from said annular zone and (e) continuously removing a product mixture of carbon monoxide and hydrogen from the reaction zone.

2. A process according to claim 1 wherein a feedstock comprising a mixture of methane and oxygen is subjected to partial oxidation.

3. A process according to claim 2 wherein the partial oxidation is carried out at atmospheric pressure and a temperature in the range of 500°–750° C.

4. A process according to claim 2 wherein the feedstock is natural gas.

5. A process according to claim 4 wherein the catalyst is a supported palladium catalyst.

6. A process according to claim 4 wherein said membrane comprises a porous alumina tube having a palladium film superimposed on the inner wall thereof.

7. A process according to claim 1 wherein a feedstock comprising a mixture of methane and carbon dioxide is reacted in the catalytic reaction zone.

8. A process according to claim 7 wherein the feedstock is natural gas.

9. A process according to claim 8 wherein catalytic reaction is carried out at atmospheric pressure and a temperature in the range of 500°–750° C.

10. A process according to claim 8 wherein the catalyst is a supported palladium catalyst.

11. A process according to claim 8 wherein said membrane comprises a porous alumina tube having a palladium film superimposed on the inner wall thereof.

* * * * *